United States Patent [19]

Chen et al.

[11] Patent Number: 5,096,465
[45] Date of Patent: Mar. 17, 1992

[54] DIAMOND METAL COMPOSITE CUTTER AND METHOD FOR MAKING SAME

[75] Inventors: Sy-Hwa Chen, Salt Lake City, Utah; Chien-Min Sung, Northboro, Mass.

[73] Assignee: Norton Company, Worcester, Mass.

[21] Appl. No.: 450,047

[22] Filed: Dec. 13, 1989

[51] Int. Cl.$^5$ ............................................. B24D 11/00
[52] U.S. Cl. ...................................... 51/295; 51/293; 51/298; 51/308; 51/309
[58] Field of Search ................... 51/293, 295, 298, 308, 51/309

[56] References Cited

U.S. PATENT DOCUMENTS

| | | | |
|---|---|---|---|
| 2,796,706 | 6/1957 | Anderson | 51/309 |
| 2,818,850 | 1/1958 | Schwarzkopf et al. | 51/309 |
| 3,841,852 | 10/1974 | Wilder et al. | 51/295 |
| 3,871,840 | 3/1975 | Wilder et al. | 51/295 |
| 3,879,901 | 4/1975 | Caveney | 51/295 |
| 4,378,975 | 4/1983 | Tomlinson et al. | 51/309 |

Primary Examiner—William R. Dixon, Jr.
Assistant Examiner—Willie J. Thompson
Attorney, Agent, or Firm—Marmorek, Guttman & Rubenstein

[57] ABSTRACT

A superhard material-metal composite product comprises a plurality of metal coated superhard particles (diamond or cubic boron nitride), and a binder alloy forming a cementing matrix which binds the coated superhard particles into a coherent mass. The binder alloy has a melting point below about 1300° C. and is capable of wetting the metal coating on the superhard particles. The superhard material-metal composite product is formed by assembling the coated particles and the binder alloy in a graphite mold, and then hot pressing at temperatures and pressures well below the temperatures and pressures of the diamond forming region. The superhard component comprises about 40% to 75% by volume of the composite product. The superhard material-metal composite product is of intermediate quality and is particularly useful in earth boring bits for drilling soft rock formations having abrasive rock stringers therein.

78 Claims, 3 Drawing Sheets

DIAMOND METAL COMPOSITE CUTTER AND METHOD FOR MAKING SAME

FIELD OF THE INVENTION

The invention relates to superhard cutting elements made from a superhard material-metal composite having a high concentration of the superhard material, and to a method for making such cutting elements. In one embodiment, the invention relates to a low-cost cutter for an earth boring bit. The cutter includes a cutting element having a diamond table that is above about 40% to about 75% diamond particles. The diamond particles have a metallic coating and are bonded to each other and, optionally, to a tungsten carbide backing by an infiltrating alloy which forms a cementing matrix binding the diamond particles together. The cutter is made at relatively low pressures and temperatures as compared to the high pressure/high temperature diamond forming process. A cutter according to the present invention is particularly useful for drilling soft rock formations that contain intermixed abrasive stringers but which do not require high quality cutting elements made from polycrystalline diamond compacts.

As will be understood by persons skilled in the art, the term "superhard" is used to describe both diamond and cubic boron nitride materials. For convenience, the term "diamond" is used herein interchangeably with the term "superhard" and is meant to include both diamond particles and cubic boron nitride particles.

RELATED APPLICATIONS

Reference is made to applications Ser. Nos. 274,651, filed Nov. 18, 1988, 226,049 filed July 29, 1988, and 378,123, filed July 11, 1989, each of which is commonly assigned with the present application.

BACKGROUND OF THE INVENTION

Various types of natural and synthetic diamond products are known and commercially available for industrial use. These diamond products are typically used in tools that require high strength cutting elements. For example, various diamond products are used as the cutting elements in earth boring drill bits, in dressing and cutting tools (e.g., saw blades), in machining and woodworking tools (e.g., lathes), and in wire drawing dies. Diamond products are also used in applications demanding high wear resistance, for example, as bearing surfaces. In recent years, techniques have been developed for manufacturing high quality polycrystalline diamond compacts (PCD's) and incorporating such compacts into the cutting elements of these tools. Such compacts have demonstrated advantages over single crystal diamond cutting elements, such as improved wear and impact resistance.

Initially, the polycrystalline diamond compacts commercially available were thermally stable only up to a temperature of about 750° C. This limited their usefulness since the temperatures reached for certain uses exceeded 750° C. Additionally, this temperature severely restricted many of the processing steps for bonding the polycrystalline diamond compacts to tool bodies. Later on, polycrystalline diamond materials became available which have a temperature stability up to about 1200° C. An example of an unleached polycrystalline diamond compact having a temperature stability up to about 750° C. is a product sold under the tradename STRATAPAX by the General Electric Company, while an example of a polycrystalline diamond compact having a temperature stability up to 1200° C. is a product sold under the tradename GEOSET, also by the General Electric Company. Other polycrystalline diamond materials which are available in the marketplace are SYNDAX-3 and SYNDRIL, both available from De Beers.

These synthetic polycrystalline diamond compacts are characterized by sintered diamond to diamond bonds, are superhard, and have high diamond concentrations, typically in the range of about 80–95% by volume. Furthermore, they are manufactured under the ultra-high temperature and pressure conditions of the diamond forming region (above 40 kbars and between 1200° C.–2000° C.) in the presence of a catalyst/solvent which promotes diamond to diamond self-bonding. Consequently, these polycrystalline diamond products are of very high quality but are also costly to manufacture.

The high quality polycrystalline diamond products discussed above perform exceptionally well in drilling various rock formations. Drill bits incorporating the STRATAPAX compact, for example, have a wear resistance about 200 times that of drill bits with cemented tungsten carbide cutters when cutting Barre granite, and even greater when drilling other kinds of rock formations. However, there are many soft-rock formations which do not require such high quality products. For example, some shales, limestones and sandstones do not require a drill bit with the exceptional wear resistance of synthetic polycrystalline diamond compacts. In the past, such soft-rock formations have been drilled using non-diamond drill bits having, e.g., cemented tungsten carbide cutters or mill tooth bits made of steel.

While such soft rock formations do not require high quality synthetic polycrystalline diamond compact cutters, they do require cutters somewhat better than those employing cemented tungsten carbide inserts, steel mill tooth bits, or other non-diamond drill bits. This is because the soft rock formations are frequently intermixed with abrasive rock layers or stringers within their depths. Conventional non-diamond cutters are satisfactory for drilling through most of the soft rock formations. However, once an abrasive rock stringer is encountered, the cemented tungsten carbide cutters or steel mill tooth bits wear out very rapidly and may not cut any longer.

In addition to their use in the form of polycrystalline diamond compacts for cutters, diamond particles have also been used to impregnate abrasive cutting elements, such as abrasive grinding wheels and saw blades. Typically, the cutting elements are formed from a mixture of tungsten carbide powder, cobalt and diamond dust. See, e.g., U.S. Pat. Nos. 2,818,850 and 2,796,706. The diamond concentration in such impregnated products is generally less than 40% by volume.

Various techniques have been developed for improving the retention of diamond products to a backing. For example, it is known in the prior art to coat diamond particles with various metals, such as tungsten, tantalum, chromium, niobium, or molybdenum. The metallic coating may be applied to the surface of the diamond particles by a variety of known techniques, such as by sputtering, by chemical vapor or vacuum deposition, or by electrolytic or electroless coating. See, e.g., U.S. Pat. No. 3,879,901 (Caveny), and U.S. Pat. Nos. 3,841,852 and 3,871,840 (Wilder et al). An example of a method for depositing a metal coating (e.g., Cr, V, W, Mo, Ti, Mn, or Nb) onto the surface of diamond or cubic boron nitride (cBN) particles is disclosed in U.S. Pat. No. 4,339,17 (Pipkin). In application Ser. No. 261,236, commonly assigned with the present application, a technique is taught for improving the retention of diamond particles by applying multiple coating layers to the particles.

Once coated, the prior art teaches that the coated diamond particles or grits may be formed into various shapes by hot or cold pressing, and subsequent sintering or infiltration with brazing alloys. In general, these techniques have been used in connection with single crystal diamond particles, with high quality polycrystalline diamond compacts having a diamond concentration in excess of 80%, or with diamond impregnated products having a diamond concentration of less than 40% by volume.

In U.S. Pat. No. 4,378,975 (Tomlinson), for example, a tool insert is disclosed which comprises discrete chromium-coated diamond particles bonded together during a sintering process by means of a nickel-based alloy having a melting point below about 1100° C. The concentration of diamond particles in the final product is in the range of about 10 to 40% by volume. The diamond particles generally have a size of 200 microns or larger.

From the above discussion, it will be seen that two kinds of synthetic diamond cutting elements are currently available. The first kind contains high quality polycrystalline diamond compacts. These compacts are more than 80% by volume diamond, are made under high pressure, high temperature ("HPHT") conditions, are characterized by sintered diamond to diamond bonds, and are expensive to manufacture. The other kind of synthetic diamond cutting element contains the less expensive impregnated product. This kind of cutting element is less than 40% by volume diamond and is of much lower quality than a polycrystalline diamond cutting element. There are no synthetic diamond cutting elements available which are cheap to manufacture and are of intermediate quality, namely, having a diamond concentration in the range of above about 40% to about 75% by volume. Such cutting elements would find use in all typical applications for synthetic diamond products, but would be especially useful in earth boring drill bits for drilling soft rock formations, such as shale formations.

Accordingly, there is a need to provide a synthetic diamond cutting element made from a diamond-metal composite having a concentration of diamond or another superhard material in the range of above about 40% to about 75% by volume.

There is a further need to provide a cutting element of the kind mentioned above wherein the diamond particles ar metallically and/or chemically bonded to each other and, optionally, to a backing member, by an infiltrating alloy which forms a cementing matrix for the coated diamond particles.

There is a further need to provide a cutting element of the kind mentioned above which is suitable for use in a earth boring drill bit for drilling soft rock formations with intermixed abrasive rock stringers.

There is yet another need to provide a relatively low cost method for manufacturing a cutter of the kind mentioned above, which method employs pressures and temperatures well below those of the diamond forming region.

SUMMARY OF THE INVENTION

These and other needs are met by means of the present invention which provides a superhard material-metal composite product comprising a plurality of metal coated superhard particles, and a binder alloy which is capable of wetting the metal coating on the superhard particles and which has a melting point below about 1300° C. The binder alloy forms a cementing matrix which binds the coated superhard particles together into a coherent mass and, optionally, to a backing member. Preferably, the bonds formed by the cementing matrix are of a metallic nature, in which there is inter-diffusion of the components at the interface, and/or of a chemical nature, in which there is a chemical reaction at the interface. In some cases, however, the bonds may be of a mechanical nature only. The superhard particles comprise about 40% to 75% by volume of the coherent mass.

The superhard particles that are used in accordance with the present invention are natural or, preferably, synthetic single crystal diamond particles. Alternatively, the superhard particles may comprise crushed polycrystalline diamond particles, cubic boron nitride (cBN) or wurzitic boron nitride particles.

In one of its preferred embodiments, the present invention provides a cutting element suitable for use in an earth boring bit, the cutting element comprising a diamond component which is above about 40% to about 75% by volume of diamond particles, the diamond particles being coated with a metallic coating and a suitable infiltrating alloy metallically and/or chemically bonding the coated diamond particles to each other into a coherent mass of predetermined configuration. In some cases, the cutting element is an unbacked or a free standing diamond table which can be brazed to a bit body. In other cases, the cutting element is not a free standing product, but the diamond component is bonded by means of the infiltrating alloy to a cemented tungsten carbide backing member, which in turn can be brazed to a bit body.

The inventive product may be formed with particles of a single large size, or with a bimodal distribution of large sized and smaller sized particles. While it is preferred that the smaller sized particles be superhard particles, other kinds of abrasive particles, such as tungsten carbide, silicon carbide, aluminum oxide, etc., may also be used as the smaller sized particles. When a cutting element is made with a single size of superhard particles, the particles are about 50 to 2,000 microns in diameter, most preferably about 400 to 600 microns in diameter, and the concentration of superhard particles in the final product is about 50 to 65%, sometimes as high as 70% or more, by volume. When the cutting element is made with a bimodal distribution of particle sizes, about 90% of the particles are 30/40 mesh size (about 400 to 600 microns in diameter), while about 10% are 230/270 mesh size (about 50 to 65 microns in diameter). The smaller particles surround and lie in the interstices between the larger particles thus increasing the concentration of superhard particles in the final product. In the case of a bimodal distribution, the concentration may reach as high as 75% by volume.

The metallic coating on the larger diamonds, whether the superhard component is of a single or bimodal size distribution, may be either a single layer coating, such as a nickel boride (NiB), tungsten, copper or tin coating, a double layer coating, such as a tungsten/chromium (W/Cr) or a tungsten/nickel boride (W/NiB) coating, or even a triple layer coating, such as a nickel boride/tungsten/chromium (NiB/W/Cr) coating. In each of these cases, the total thickness of the metallic coating on the superhard particles is about 0.5 to 30 microns thick, preferably about 2 to 10 microns thick. Desirably, the smaller sized particles in a bimodal distribution also have a metallic coating. The metal coating on the smaller particles is preferably a single layer coating of NiB, about 1 to 10 microns thick.

The infiltrating alloy which forms a component of the inventive product has a melting point in the range of about 650° to 1300° C. and is selected so that it is capable of wetting the coated diamond particles. Nickel, cobalt, iron, aluminum, and copper based alloys have been found suitable as infiltrating alloys.

The present invention also provides a method for manufacturing a cutter of the kind described above under relatively low pressure and temperature conditions. The inventive method comprises vibrationally packing the coated superhard particles in a container, and thereafter vibrationally filling the smaller size coated particles in the container when a bimodal distribution of particles is employed. The packing steps distribute the superhard particles into one or more uniform layers with the smaller-sized particles (when present) located around and between the larger particles. The density of superhard particles at this point is about 50 to 60% by volume. The infiltrating binder alloy is then uniformly spread over the packed particles and a backing member, when desired, is placed on top of the binder alloy layer. Alternatively, the infiltrating binder alloy can be placed first in the container and then the coated superhard particles added afterwards followed by a backing member when desired. Thereafter, the assembly is subjected to "hot pressing," i.e., the assembly is subjected to a pressure of about 5,000 psi while heating at a temperature of about 900 to 1,100° C. in a graphite mold under air and then a $CO/CO_2$ atmosphere as the graphite burns for about one to six minutes. These conditions cause the binder alloy to melt and to flow into the void spaces among the particles, while at the same time wetting the coated particles.

Upon cooling, the binder alloy forms a cementing matrix which binds the diamond or other superhard particles to each other and, when present, to the backing member. The diamond region in the final product desirably has a diamond concentration of about 60 to 75% by volume. This high concentration diamond product may be incorporated by brazing into an earth boring bit. The earth boring bit is suitable for drilling soft rock formations of the kind described above and exhibits vastly superior performance characteristics in comparison to non-diamond drill bits.

DETAILED DESCRIPTION OF THE INVENTION

In accordance with this invention, a superhard product, typically a cutter for an earth boring bit, is provided which is made from a novel superhard material-metal composite. The composite is characterized by a high concentration of coated superhard particles metallically and/or chemically bonded to each other and to a tungsten carbide backing if desired, such as an insert for a drill bit, by means of a suitable infiltrating binder alloy. Also in accordance with the present invention, a novel method utilizing relatively low pressures and temperatures is provided for producing the superhard material-metal composite.

The starting material is a superhard grit composed of single crystal diamond particles, polycrystalline diamond particles, or cubic boron nitride particles having a particle size in the range of about 50 to 2,000 microns, preferably about 300–1,000 microns, and most preferably in the range of about 400 to 600 microns in diameter. The most preferred particles are sized through a 30/40 mesh sieve. The superhard particles, when diamond, may be either natural or synthetic single crystal diamonds, or crushed polycrystalline diamond particles, although synthetic single crystal diamonds are preferred. Optionally, the starting superhard grit material is first cleaned to remove oxidants and other surface impurities before processing. For example, a starting diamond material may be cleaned by heating in a hydrogen atmosphere at a temperature of about 700 to 1,000° C. for about 10 to 60 minutes. After cleaning, the superhard particles are coated with one or more metallic layers. For example, the particles may be coated with tungsten by the technique of chemical vapor deposition. As is well known to those of ordinary skill in the art, in accordance with this technique, a metal compound such as a chloride or a fluoride of the metal is heated to a temperature sufficient to decompose the compound to form a vapor of the metal which then deposits on the grit material. A layer of chromium may be coated onto the particles by metal vapor deposition, while a layer of NiB may be deposited by an electroless coating technique taught by the Allied-Kelite Division of Witco Company.

In accordance with the present invention, either a single layer or a multilayer metallic coating may be deposited on the particles. The coating should have a thickness which is not too large nor too small. A thicker metallic coating facilitates wetting of the particles by the infiltrating binder alloy. On the other hand, too thick a coating will reduce the concentration of superhard particles. Whether the coating is a single layer or a multi-layer structure, it has been found that a total coating thickness in the range of about 0.5 to 30 microns, and preferably in the range of about 2 to 10 microns, is most suitable. Typically, the coating occupies between 1 and 30% by volume of the superhard material-metal composite.

A number of different metals are suitable for coating the superhard grits. The metals should have a melting point higher than the temperatures used in subsequent processing and should be compatible with the infiltrating alloy. When the superhard particles are diamond, it is most desirable that the coating include a layer of a strong metal carbide former such as vanadium or chromium, so as to form strong chemical bonds to the diamond particles. In the case of cBN particles, the coating should include a metal nitride or boride former. It is also desirable that the coating include an oxidation resistant metal, such as tungsten, molybdenum or tantalum. Typical metal coatings useful in the practice of this invention include one or more layers of tungsten, tantalum, molybdenum, chromium, vanadium, copper, nickel and tin. Coatings which include a layer of cobalt, iron, palladium or platinum are also suitable since these metals are easily wetted by the infiltrating agent.

In one embodiment of the invention, single crystal diamond particles having a size in the range of about 400-600 microns (referred to herein as the larger size diamonds) are coated with a single layer of nickel boride (NiB) that is about 10 to 20 microns, preferably about 10 microns, thick. In other embodiments of the invention, the larger size diamonds are coated with a two-layer structure, e.g., tungsten/chromium, tungsten/nickel boride, or a three-layer structure, comprising, for example, an inner layer of about 0.05 to 1 micron, preferably about 0.1 micron, of chromium, about 5 to 10 microns of tungsten on top of the chromium layer, and an outer layer of about 10 to 20 microns of NiB. Each of the metal layers may be applied by variations of the chemical vapor deposition technique discussed above, while the NiB layer may be applied by electroless coating. Some interfacial bonding may occur during coating and subsequent processing, and this is not at all undesirable. Thus, in the three-layer structure, the conditions may be such that the chromium chemically bonds to the diamond material to form a layer of chromium carbide during coating, while the tungsten subsequently bonds to the chromium carbide layer.

After the larger size particles are cleaned and coated as described above, they are placed into a suitable container and vibrationally packed. The vibrational packing operation involves vibrating the container and its contents while applying a weight to the layer of superhard particles. This causes the larger size particles to distribute themselves evenly along the bottom of container in one or more layers. Thereafter, if desired, a secondary charge of smaller size particles about 1/6 to 1/9 the size of the larger size particles is introduced into the container. The secondary charge comprises preferably superhard particles, generally single crystal diamonds, or other abrasive particles in the size range of about 25-75 microns, preferably about 50-65 microns (230/270 mesh), to which a coating of NiB about 1-10 microns thick, preferably about 5 microns thick, has been applied by methods such as those discussed above. The secondary charge is added in amounts which comprise about 10 to 30% by volume of the initial charge of larger size particles. The purpose of the secondary charge is to increase the concentration of abrasive material by surrounding and/or filling the interstices between the larger size superhard particles with smaller size superhard or other abrasive particles. This is accomplished by vibrationally packing the container once again after the secondary charge has been introduced into the container. The resulting charge generally has a density of about 40-75% by volume of the superhard material.

In yet another embodiment of the invention, the superhard product has a trimodal distribution of particles. In this embodiment, a third charge of yet smaller superhard or abrasive particles, about 1/6 to 1/9 the size of the secondary charge of particles is added to the container and vibrationally packed.

Figure 1A:
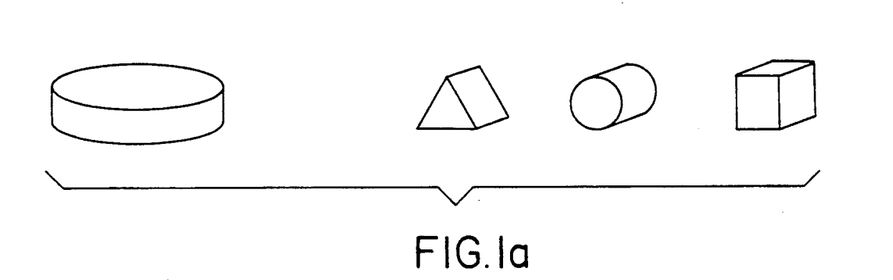
FIGS. 1a and 1b illustrate various shapes of cutting elements according to the present invention.
Figure 1B:
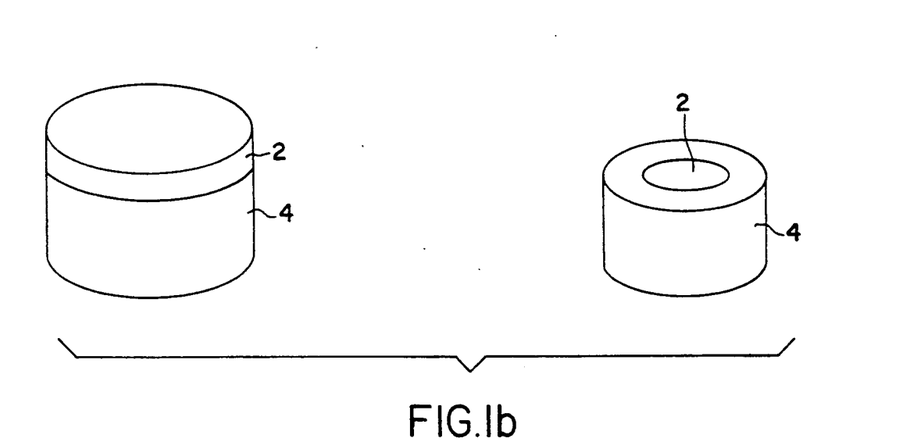

An infiltrating binder alloy in powder form is next placed in the container above or over the table of superhard particles. The binder alloy may also be applied to the table as a preformed disc or foil. If a backed product is desired, a backing member, e.g., an insert for an earth boring bit made from, e.g., cemented tungsten carbide, boron carbide, silicon carbide, or titanium nitride, is placed atop the binder alloy. Backing members of steel, ceramic materials, or other refractory materials may also be employed. The assembly is then ready for hot pressing into any desired shape in a graphite mold at temperatures in the range of about 650 to 1300° C., and at pressures in the range of about 1,000 to 20,000 psi, preferably at a pressure of about 3,000 to 6,000 psi Most preferably, hot pressing is done at a temperature of about 900 to 1100° C. and at a pressure of about 5,000 psi. The hot pressing is carried out for about 1 to 6 minutes and produces a product useful as a cutter which is either a free standing or a backed product having a superhard component that is, above about 40% to about 75%, preferably about 50 to 75%, most preferably about 60 to 75%, by volume of the superhard material. FIG. 1a shows typical free standing cutting elements of various shapes prepared in accordance with the present invention. FIG. 1b shows backed cutting elements having a diamond component 2 and a backing member 4. The cutting elements shown in FIGS. 1a and 1b may be brazed directly to the body of an earth boring bit. The cutting elements can also be used in dressing or cutting tools, in machining and woodworking tools, in wire drawing dies, or as a bearing element.

Liquid state infiltration takes place during the hot pressing stage. The binder alloy melts during this stage and due to the applied pressure, is forced into the void spaces remaining in the packed grit material. The binder alloy wets the coated particles, and, upon cooling, the binder alloy forms a metallic matrix which binds the particles to each other and to the tungsten carbide insert (when present), thereby forming the free standing or the backed product. Typically, the infiltrating alloy comprises about 20 to 40% by volume of the final product.

In order for the liquid state infiltration to be carried out successfully, the binder alloy should have a melting point lower than the temperature at which hot pressing is carried out, i.e., it should have a melting point in the range of about 650 to 1300° C., preferably between about 900 to 1100° C. It is also important that the binder alloy be able to wet the coated particles. Suitable alloys include the nickel-chromium based alloys having a melting point in the range of 900 to 1100° C. which are sold under the trade name NICROBRAZ by Wall Colmonoy Corp. Copper based alloys, for example, a binder alloy comprising 70% by weight copper and 30% by weight manganese, may also be used. Such copper-based alloys are suitable for wetting diamond particles coated with one or more layers of chromium, tungsten, nickel, and nickel boride. Other suitable infiltrating alloys are cobalt, tin, nickel, iron, or aluminum based. The NICROBRAZ alloys are preferred as infiltrating alloys.

The resulting products are characterized by an absence of sintered diamond-diamond or cBN-cBN bonds which are formed under HPHT conditions. Rather, the superhard particles are metallically and/or chemically bonded to the supporting metallic matrix of the binder alloy. In some cases, for example, when the particles have a nickel, copper or tin coating, the coating layer disperses into the matrix and the particles are held in place mechanically rather than by chemical or metallic bonds. In all cases, however, the structure is referred to as a "cemented" structure.

The cutting elements shown in FIGS. 1a and 1b may be made to any desired shape or configuration using a traveling wire electrical discharge machine ("EDM"). In general, such systems use a vertical traveling wire to cut electrically conductive materials by electrical spark erosion. As the cutting wire nears the workpiece, sparks are discharged from the cutting wire and erode small pieces of material from the workpiece surface. The eroded material is flushed from the workpiece with deionized water.

Conventional thermally stable cutting elements made from polycrystalline diamond compacts cannot be cut by EDM machines because they are not sufficiently electrically conductive. Geoset compacts do not contain any metallic interstitial components to be electrically conductive, while the presence of Si/SiC in Syndax-3 polycrystalline diamond compacts available from De Beers renders them unsuitable for cutting by EDM systems. The diamond-to-diamond self-bonding characteristic of these compacts also reduces their suitability to EDM cutting systems. They are usually formed to a specific shape in situ, or cut to shape with lasers. However, if the superhard particles are not too large, the metallic matrix in the cutting elements of the present invention often provides sufficient electrical conductivity so that they may be cut to any desired shape or configuration by conventional traveling wire EDM machines.

The invention will now be described by reference to the following examples.

EXAMPLE 1

Synthetic single crystal diamonds of 30/40 mesh size were cleaned and coated by one of the techniques described above. In one set of experiments, the 30/40 mesh size diamonds were coated electrolessly with a single layer coating of NiB which was 10 microns thick. In another set of experiments, the 30/40 mesh size diamonds were coated with a triple layer coating comprising 0.1 microns of chromium, 5–10 microns of tungsten, and 5–10 microns of NiB.

Figure 2:
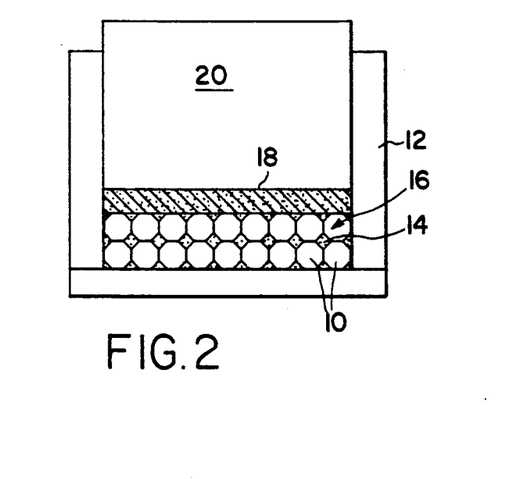
FIG. 2 illustrates a container into which the components needed to form the inventive cutter may be assembled.

Referring now to FIG. 2, a 0.5 gram charge diamond weight of coated diamonds 10 of 30/40 mesh size was loaded into a cup 12 of 0.5" i.d. made from tantalum or iron and vibrationally packed for about 50 seconds. The 30/40 mesh diamonds assorted themselves into two or three layers. Next, a secondary charge of 0.05 grams of diamonds 14 of 230/270 mesh size which was coated with a 5 micron thick layer of NiB was added to cup 12. The cup 12 was vibrationally packed once again, this time for 3 to 20 seconds. The 230/270 mesh diamonds 14 distributed themselves by surrounding and/or filling in the interstices between the 30/40 mesh diamonds 10 resulting in a diamond table 16 which had a diamond concentration of about 50–60 v%.

About 1.0 grams of Nicrobraz LM binder alloy in powder form was uniformly spread as layer 18 on top of the diamond table 16. Nicrobraz LM has a melting point in the range of 970 to 1,000° C. and a composition that is 7% chromium, 3% iron, 3.1% boron, 0.06% carbon, 4.5% silicon, and the balance nickel. A cemented tungsten carbide insert 20 was then placed on top of binder layer 18. At this point, the assembly was ready for hot pressing.

EXAMPLE 2

Figure 3:
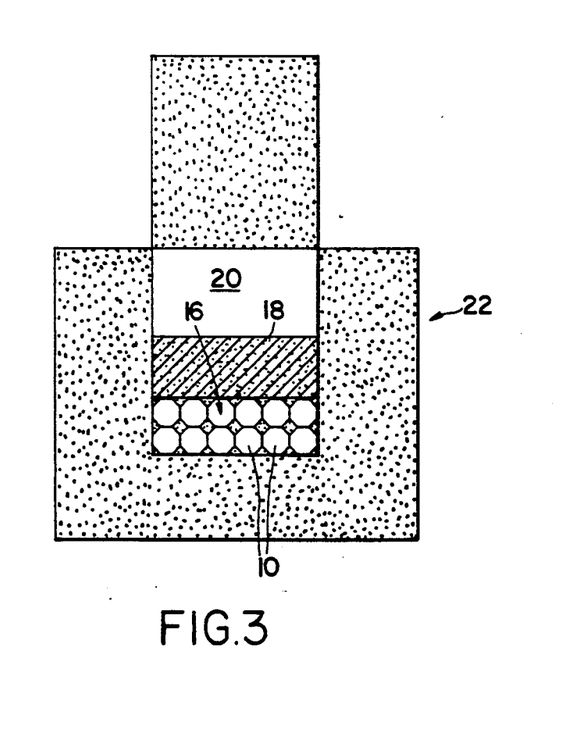
FIG. 3 illustrates an apparatus suitable for carrying out hot pressing.

Two to four cups prepared in accordance with the procedures of Example 1 were placed in graphite mold 22 (FIG. 3). Hot pressing was performed in graphite mold 22 at a pressure of 5,000 psi and a temperature of 1,030° C. for 1 to 6 minutes.

Figure 4:
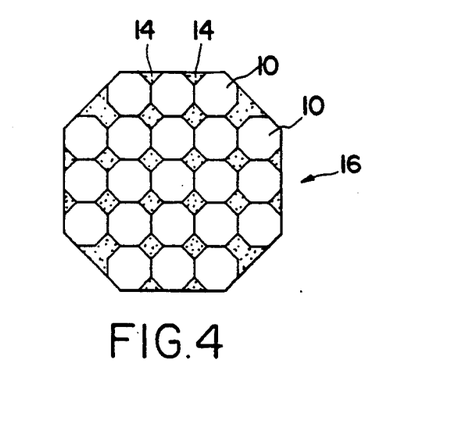
FIG. 4 is a top plan view showing the diamond table of a cutter of the present invention.
Figure 5:
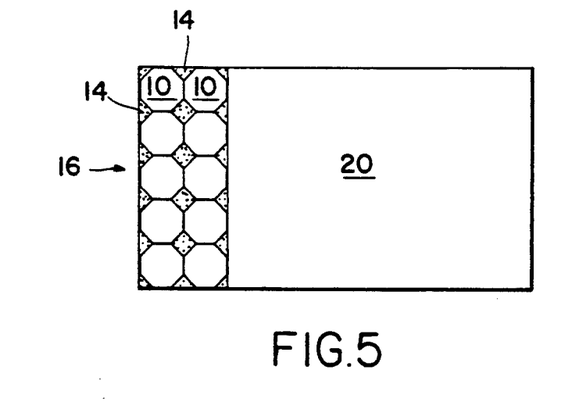
FIG. 5 is a side view of a cutter of the present invention.

After hot pressing, the whole graphite mold was cooled in air and diamond-metal composite cutters, such as those shown in FIGS. 4 and 5 were removed from the graphite mold. The cutters were then put in a centerless grinder to strip the cup material away and to grind the cutters to exact specifications for drilling applications. The diamond table and support were lapped to remove cup materials and excess binder, and exact specifications were achieved. These cutters were characterized by having a diamond table which is two or three layers of diamonds thick, a bimodal distribution of diamonds, and a final diamond density of 60 to 67 v%. Additionally, the diamond table was characterized as a cemented structure having diamond-to-metal-to-diamond bonds rather than diamond-to-diamond bonds. More specifically, the bonding structure could be described as diamond-coating-alloy-coating-diamond.

EXAMPLE 3

Six diamond-metal cutters were made in accordance with the procedures of Examples 1 and 2. In this case, 0.5 gm of diamond, De Beers SDA 100+, 30/40 mesh and coated with a layer of NiB 10 microns thick, was vibrationally packed together with 0.05 gm of diamond, De Beers MDA 100, 230/270 mesh, and coated with a layer of NiB 5 microns thick. One gram of Nicrobraz LM powder was uniformly spread on the diamond table. A cemented tungsten carbide insert containing 13% Co (made by Teledyne, H81 grade) was assembled on top of the binder phase. The structure was hot pressed at a pressure of 5,000 psi, and at a temperature of 1,030° C. for six minutes. Six cutters were produced having a diamond table which had a diamond concentration of 67% by volume.

The six cutters produced were brazed onto a mining core bit and tested on Indiana limestone, Navajo sandstone and Nugget sandstone. At the same time, six cutters made from cemented tungsten carbide (13% Co H81 grade from Teledyne) were brazed onto another mining core bit and tested on the same rock formations.

Both the inventive diamond-metal cutters and the cemented tungsten carbide cutters were tested for wear resistance. Both kinds of cutters, easily drilled through four feet of the Indiana limestone and four feet of the Navajo sandstone at a drilling rate of 100 ft/hr. Subsequent to these tests, the inventive diamond-metal cutters were able to drill through an additional 30 feet of Nugget sandstone at an approximate load of 750 pounds and at a rate of penetration of 10 ft/hr. The cemented tungsten carbide cutters, however, were able to drill through only one inch of the Nugget sandstone before the load limits of the drill rig were exceeded.

In a further test, the inventive diamond metal cutters were subjected to an erosion test to determine their ability to withstand erosive slurries which simulate the mud and cooling water injected into wells during drilling. The test consisted of spraying the cutters with a silicon carbide slurry through a ⅛" nozzle at a pressure of 700 psi (velocity of fluid = 300 ft/sec) for 30 minutes.

Erosion was measured as volume loss. The inventive diamond-metal cutters had a volume loss of 0.0476 cc as compared to a 0.0058 cc volume loss for the cemented tungsten carbide cutters (H81 Teledyne Firth, 13% Co) and a 0.078 cc volume loss of the bit body (60% $WC/W_2C$ matrix and a 40% copper based binder). Although the erosion resistance of the diamond-metal cutters was less than that of the cemented tungsten carbide cutters, it was still within acceptable limits.

In summary, a novel superhard material-metal cutter, such as a diamond-metal cutter, has been disclosed which has a high concentration of superhard material and which is manufactured under relatively low temperature and low pressure conditions. The cutter is useful for drilling soft rock formation which do not require high quality superhard cutters containing polycrystalline diamond compacts made at high pressure and high temperatures and having diamond-to-diamond bonds.

While the invention has been described by reference to specific embodiments, this was for purposes of illustration only and should not be construed to limit the spirit or the scope of the invention.

We claim:

1. A superhard material-metal composite product, comprising
   a plurality of metal coated superhard particles, and
   a binder alloy having a melting point below about 1300° C., said binder alloy forming a matrix binding said coated superhard particles into a coherent mass,
   said superhard particles comprising above about 40% to about 75% by volume of said coherent mass,
   said metal being wetted by said binder alloy when said binder alloy is caused to flow.

2. The composite product of claim 1 wherein said superhard particles are diamond particles.

3. The composite product of claim 2 wherein said superhard particles are single crystal diamond particles.

4. The composite product of claim 2 wherein said superhard particles are polycrystalline diamond particles.

5. The composite product of claim 1 wherein said superhard particles are cubic boron nitride or wurzitic boron nitride particles.

6. The composite product of claim 1 wherein said superhard particles comprise about 50 to 75% by volume of said coherent mass.

7. The composite product of claim 1 wherein said superhard particles comprise about 60 to 75% by volume of said coherent mass.

8. The composite product claim 1 wherein said superhard particles are about 50 to 2,000 microns in diameter.

9. The composite product of claim 1 wherein said superhard particles are about 300 to 1,000 microns in diameter.

10. The composite product of claim 1 wherein said superhard particles are about 400 to 600 microns in diameter.

11. The composite product of claim 1 wherein said superhard particles comprise a first set of superhard particles and a second set of abrasive particles, said first set of superhard particles being substantially larger than said second set of abrasive particles.

12. The composite product of claim 11 wherein said abrasive particles are diamond or cubic boron nitride particles.

13. The composite product of claim 11 wherein said abrasive particles are tungsten carbide, silicon carbide, or aluminum oxide particles.

14. The composite product of claim 11 wherein said second set of abrasive particles is about 1/6 to 1/9 the size of said first set of superhard particles.

15. The composite product of claim 11 wherein said superhard particles of said first set are about 50 to 2,000 microns in diameter and said abrasive particles of said second set are about 25 to 75 microns in diameter.

16. The composite product of claim 11 wherein said superhard particles of said first set are about 400 to 600 microns in diameter and said abrasive particles of said second set are about 50 to 65 microns in diameter.

17. The composite product of claim 11 further comprising a third set of abrasive particles, said third set of abrasive particles being about 1/6 to 1/9 the size of said second set of abrasive particles.

18. The composite product of claim 11 wherein said second set of abrasive particles comprises about 10 to 30% by volume of said first set of superhard particles.

19. The composite product of claim 11 wherein said second set of abrasive particles comprises about 10% by volume of said first set of superhard particles.

20. The composite product of claim 1 further comprising a backing member, said matrix binding said coated superhard particles to said backing member.

21. The composite product of claim 20 wherein said backing member is made from cemented tungsten carbide, silicon carbide, boron carbide, titanium nitride, steel, or a ceramic material.

22. The composite product of claim 20 wherein said backing member is made from cemented tungsten carbide.

23. The composite product of claim 1 wherein said superhard particles are coated with a metal layer that is about 0.5 to 30 microns thick.

24. The composite product of claim 23 wherein said metal layer is 2 to 10 microns thick.

25. The composite product of claim 23 wherein said metal layer includes a carbide forming metal, a boride forming metal, or a nitride forming metal.

26. The composite product of claim 23 wherein said metal layer includes an oxidation resistant metal.

27. The composite product of claim 23 wherein said metal layer includes nickel boride.

28. The composite product of claim 23 wherein said metal layer includes a metal selected from the group consisting of tungsten, chromium, vanadium, molybdenum, tantalum, copper, tin, nickel, cobalt, iron, palladium, platinum and alloys thereof.

29. The composite product of claim 23 wherein said superhard particles have a coating of multiple layers.

30. The composite product of claim 1 wherein said binder alloy has a melting point in the range of about 650 to 1300° C.

31. The composite product of claim 1 wherein said binder alloy has a melting point in the range of about 900 to 1100° C.

32. The composite product of claim 1 wherein said binder alloy is a nickel based alloy.

33. The composite product of claim 1 wherein said binder alloy is a cobalt, iron, aluminum, tin, or copper based alloy.

34. The composite product of claim 1 wherein said product is a cutting element for a drill bit.

35. The composite product of claim 1 wherein said product is a cutting element for a dressing tool.

36. The composite product of claim 1 wherein said product is a cutting element for a machining tool.

37. The composite product of claim 1 wherein said product is a cutting element for a woodworking tool.

38. The composite product of claim 1 wherein said product is a cutting element for a wire drawing die.

39. The composite product of claim 1 wherein said product is a cutting element for a cutting tool.

40. The composite product of claim 1 wherein said product is a bearing element.

41. A superhard product, comprising
a superhard component comprising a first set of superhard particles and a second set of abrasive particles, said first set of particles being larger than said second set of particles, said particles of said second set substantially surrounding and being substantially located in the interstices between said particles of said first set,
said particles of said first and second sets each being coated with a metal coating,
said superhard component further including a binder alloy having a melting point less than about 1300° C. and forming a cementing matrix binding said coated particles to each other, said superhard component having a superhard particle content in the range of above about 40% to about 75% by volume.

42. The superhard product of claim 41 wherein said first set of superhard particles and said second set of abrasive particles each comprises diamond particles.

43. The superhard product of claim 42 wherein said superhard component has a diamond content in the range of about 50 to 75% by volume.

44. The superhard product of claim 42 wherein said superhard component has a diamond content in the range of about 60 to 75% by volume.

45. The superhard product of claim 42 wherein said diamond particles are single crystal diamond particles.

46. The superhard product of claim 42 wherein said second set of particles comprises about 10 to 30% by volume of said first set of particles.

47. The superhard product of claim 42 wherein said diamond particles of said first set are in the range of about 50 to 2,000 microns in diameter, and said diamond particles of said second set are in the range of about 25 to 75 microns in diameter.

48. The superhard product of claim 42 wherein said first metal coating is about 0.5 to 30 microns thick.

49. The superhard product of claim 42 wherein said metal coating on said first set of diamond particles includes multiple layers.

50. The superhard product of claim 42 wherein said metal coating on said first set of diamond particles includes a layer of nickel boride, tungsten, tantalum, molybdenum, vanadium, chromium, copper, tin, cobalt, iron, palladium, platinum, or alloys thereof.

51. The superhard product of claim 42 wherein said binder alloy is a nickel, cobalt, iron, aluminum, tin, or copper based alloy.

52. The superhard product of claim 42 further comprising a backing member, said binder alloy forming a cementing matrix binding said coated diamond particles to said backing member.

53. The superhard product of claim 52 wherein said backing member is made from cemented tungsten carbide, silicon carbide, boron carbide, titanium nitride, steel, or a ceramic material.

54. The superhard product of claim 53 wherein said backing member is an insert member made from cemented tungsten carbide for an earth boring bit.

55. A superhard cutter for an earth boring bit, comprising
a base member,
a superhard component bonded to said base member,
said superhard component comprising a first set of superhard particles having a size in the range of about 50 to 2,000 microns in diameter, and a second set of abrasive particles having a size in the range of about 25 to 75 microns in diameter, said second set of particles substantially surrounding and being substantially located in the interstices between said particles of said first set,
said particles of said first set being coated with a metallic coating that is about 2 to 10 microns thick, and said particles of said second set being coated with a metallic coating that is about 1 to 10 microns thick,
said superhard component further including a binder alloy forming a matrix binding said coated particles to each other and to said base member, said binder alloy having a melting point in the range of about 650 to 1300° C. and being capable of wetting said coated particles,
said superhard component having a superhard particle content in the range of above about 40% to about 75% by volume.

56. The cutter of claim 55 wherein said base member is a bit body.

57. The cutter of claim 55 wherein said base member is an insert member attachable to a bit body.

58. The cutter of claim 55 wherein said superhard particles of said first set are diamond or cubic boron nitride particles.

59. The cutter of claim 55 wherein said abrasive particles of said second set are diamond, cubic boron nitride, tungsten carbide, silicon carbide, or aluminum oxide particles.

60. The cutter of claim 55 wherein said particles of said first and second sets are single crystal diamond particles.

61. The cutter of claim 55 wherein said second set of particles comprises about 10 to 30% by volume of said first set of particles.

62. The cutter of claim 55 wherein said particles of said first set are in the range of about 400 to 600 microns in diameter, and said particles of said second set are in the range of about 50 to 65 microns in diameter.

63. The cutter of claim 62 wherein said metallic coatings each includes a layer of nickel boride.

64. The cutter of claim 63 wherein said metallic coating on said first set of superhard particles further includes a layer of tungsten, chromium, tantalum, molybdenum, vanadium, copper, tin, nickel, cobalt, iron, palladium, platinum, or alloys thereof.

65. The cutter of claim 64 wherein said binder alloy comprises a nickel, cobalt, iron, aluminum, tin, or copper based alloy.

66. The cutter of claim 65 wherein said base member is made from steel, cemented tungsten carbide, silicon carbide, boron carbide, titanium nitride, or a ceramic material.

67. The cutter of claim 66 wherein said superhard component includes a plurality of layers of said superhard particles of said first set.

68. A method for forming a superhard material-metal composite product at temperatures and pressures below the diamond forming range of temperatures and pressures, comprising packing a charge of superhard particles into a container, said superhard particles being coated with a metal coating, introducing a binder alloy into said container, said binder alloy having a melting point of less than 1300° C. and being capable of wetting said coated superhard particles when caused to flow, heating said superhard particles and said binder alloy to a temperature between about 650 to 1300° C. while applying a pressure in the range of about 1,000 to 20,000 psi, thereby causing said binder alloy to flow and to wet said coated superhard particles, and removing said pressure and allowing said superhard particles and said binder alloy to cool.

69. The method of claim 68 wherein said superhard particles comprise diamond particles.

70. The method of claim 68 wherein said superhard particles and binder alloy are heated to a temperature in the range of about 900 to 1100° C.

71. The method of claim 68 wherein said superhard particles and binder alloy are subjected to a pressure of about 3,000 to 6,000 psi.

72. The method of claim 68 wherein said superhard particles and binder alloy are subjected to a pressure of about 5,000 psi.

73. The method of claim 68 wherein said heat and pressure are applied for a period of about one to six minutes.

74. The method of claim 68 wherein said binder alloy is introduced into said container prior to introducing said superhard particles into said container.

75. The method of claim 68 further comprising packing a second charge of abrasive particles into said container prior to said heating step, said particles of said second charge being smaller than said particles of said first charge, said particles of said second charge substantially surrounding and being substantially located in the interstices between said particles of said first charge.

76. The method of claim 75 wherein said abrasive particles are diamond, cubic boron nitride, tungsten carbide, silicon carbide, or aluminum oxide particles.

77. The method of claim 75 further comprising packing a third charge of abrasive particles into said container prior to said heating step, said particles of said third charge being smaller than said particles of said second charge.

78. The method of claim 68 further comprising placing a backing member on top of said mixture of superhard particles and binder alloy prior to said heating step.

* * * * *